United States Patent [19]
Ouchi et al.

[11] Patent Number: 6,091,556
[45] Date of Patent: Jul. 18, 2000

[54] DATA RECORDING AND REPRODUCING APPARATUS USING TWO ORTHOGONAL CODE STREAMS

[75] Inventors: Kazuhiro Ouchi; Naoki Honda; Atsushi Kikawada, all of Akita, Japan

[73] Assignee: Governor of Akita Prefecture, Akita, Japan

[21] Appl. No.: 08/613,043

[22] Filed: Mar. 8, 1996

[30] Foreign Application Priority Data

Mar. 27, 1995 [JP] Japan .................................. 7-067706

[51] Int. Cl.⁷ .................................. G11B 5/09; G11B 5/02
[52] U.S. Cl. .................................. 360/40; 360/29; 360/41
[58] Field of Search .................................. 360/40, 48, 41, 360/29; 364/22, 727; 370/209; 348/401, 403, 404, 405, 409

[56] References Cited

U.S. PATENT DOCUMENTS

| | | | |
|---|---|---|---|
| 3,432,619 | 3/1969 | Blasbalg . | |
| 3,715,508 | 2/1973 | Blasbalg | 179/15 BC |
| 3,952,329 | 4/1976 | Dent et al. | 360/40 |
| 4,346,413 | 8/1982 | Hack | 360/77.07 |
| 4,797,944 | 1/1989 | Tanaka | 382/56 |
| 4,967,289 | 10/1990 | Kanota et al. | 360/68 |
| 5,003,407 | 3/1991 | Nakano et al. | 386/97 |
| 5,237,424 | 8/1993 | Nishino et al. | 386/40 |
| 5,321,440 | 6/1994 | Yanagihara et al. | 348/408 |
| 5,559,931 | 9/1996 | Shindou et al. | 395/105 |
| 5,644,307 | 7/1997 | Fukuda | 341/68 |

OTHER PUBLICATIONS

Mueller, Scott; "Upgrading and Repairing PCs", 1996.

*Primary Examiner*—Paul Loomis
*Assistant Examiner*—Regina Y. Neal
*Attorney, Agent, or Firm*—John P. White; Cooper & Dunham LLP

[57] ABSTRACT

A data recording device such as a hard disk apparatus has an orthogonal coding circuit and a modulation circuit. The orthogonal coding circuit encodes recording data to be recorded to adjacent two tracks as two orthogonal code streams which are included in an Hadamard matrix. The modulation circuit outputs recording signals, which are obtained by modulating the code streams using the NRZI system, to a magnetic head. Reproduction signals read out from a magnetic disk by the magnetic head are decoded as recording data based upon given decoding rules according to the two code streams.

7 Claims, 11 Drawing Sheets

FIGURE 11
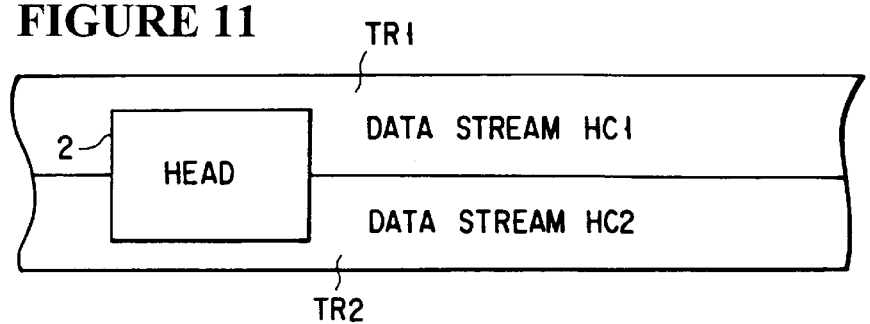
FIGURE 12A
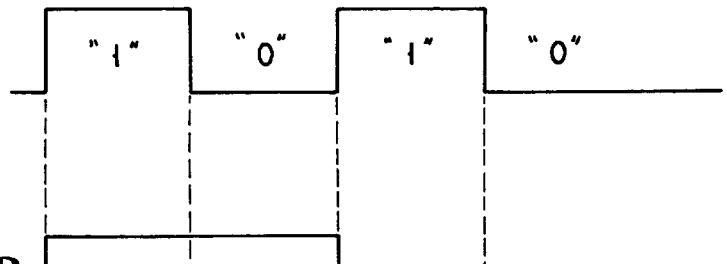
FIGURE 12B
FIGURE 12C
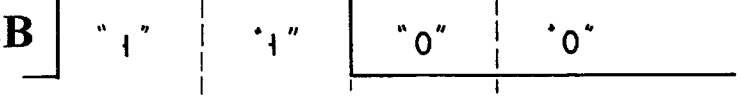
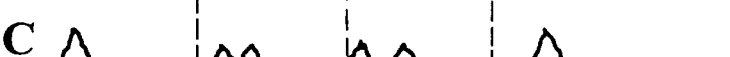
FIGURE 12D
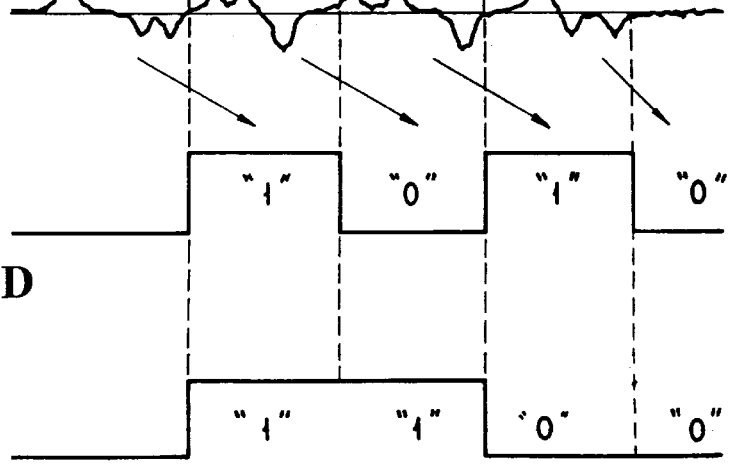
FIGURE 12E

DATA RECORDING AND REPRODUCING APPARATUS USING TWO ORTHOGONAL CODE STREAMS

BACKGROUND OF THE INVENTION

1. Field of the Invention

The present invention relates to a data recording and reproducing apparatus for recording and reproducing data in and from a digital data recording medium such as a hard disk and an optical disk.

2. Description of the Related Art

In a data recording/reproducing apparatus utilizing a disk-like recording medium, such as a hard disk device (HDD) and an optical disk device, there is provided a recording area formed of a plurality of concentrically circular tracks on a disk surface. Each track (recording area for one cycle) is divided into plural sectors. In such an HDD, in order to provide higher recording density, it is necessary to reduce the width of each track and to reduce an interval between tracks.

However, in order to avoid influence of crosstalk between adjacent tracks, usually, a non-recording area, i.e. a guard band are provided between the tracks. As the area of the guard band is narrower, the track density can be higher, thereby making it possible to improve recording density. Nevertheless, if accuracy of tracking control, for positioning a head on a target track is low, it is necessary to widen the area of the guard band. As mentioned above, as to the area of the guard band, a requirement of the recording density disagrees with a requirement of the tracking control accuracy. Moreover, it is necessary for higher recording density to narrow the tracking width, but in an optical disk device, in order to avoid influence of crosstalk, it is impossible to reduce a track pitch further than optical resolution.

In a recording and reproducing apparatus using a medium other than a disk recording medium, such as in a video tape recorder (VTR), since azimuth angles of adjacent tracks are different so that the azimuth effect can be utilized, the influence of crosstalk caused by the adjacent tracks is reduced. As a result, guard bands between adjacent tracks are not required.

However, such an azimuth recording system requires a special recording and reproducing head. Furthermore, the azimuth recording system has disadvantages such that crosstalk elimination performance of a low-frequency component is low and as the track width becomes narrower, the crosstalk elimination performance is deteriorated worse.

Therefore, it is impossible for a prior data recording and reproducing apparatus to attain higher recording density without influence of crosstalk.

SUMMARY OF THE INVENTION

It is an object of the present invention to provide a data recording and reproducing apparatus which is capable of achieving high recording density without providing a guard band area between tracks if a disk recording medium, such as an HDD, is used and without adopting an azimuth recording system which is a special recording system if-a tape recording medium is used.

In the data recording and reproducing apparatus of the present invention, when data are recorded to tracks successively arranged on a recording medium, such as a disk, the recording data in the adjacent two tracks are converted into orthogonal or quasi orthogonal code streams. When the data is reproduced, reproduced code streams read out from the adjacent two tracks are decoded based upon prescribed decoding rules.

Therefore, in the case of the data reproduction, even if crosstalk is generated between the adjacent tracks, each data stream is decoded by different decoding rules, so the data streams reproduced from the two tracks do not interfere with each other. In other words, the adjacent tracks are not practically influenced by the crosstalk, so even if the gap, such as a guard band, does not exist between the tracks, secure data discrimination can be realized. Therefore, it is possible to obtain high track density where gaps between tracks are very narrow or where a special recording system such as an azimuth recording system is not adopted.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 11 shows a main part of a fourth embodiment of the present invention; and

FIGS. 12A through 12E show a batch reproducing system according to a fourth embodiment of the present invention.

DETAILED DESCRIPTION OF THE PREFERRED EMBODIMENT

Figure 1:
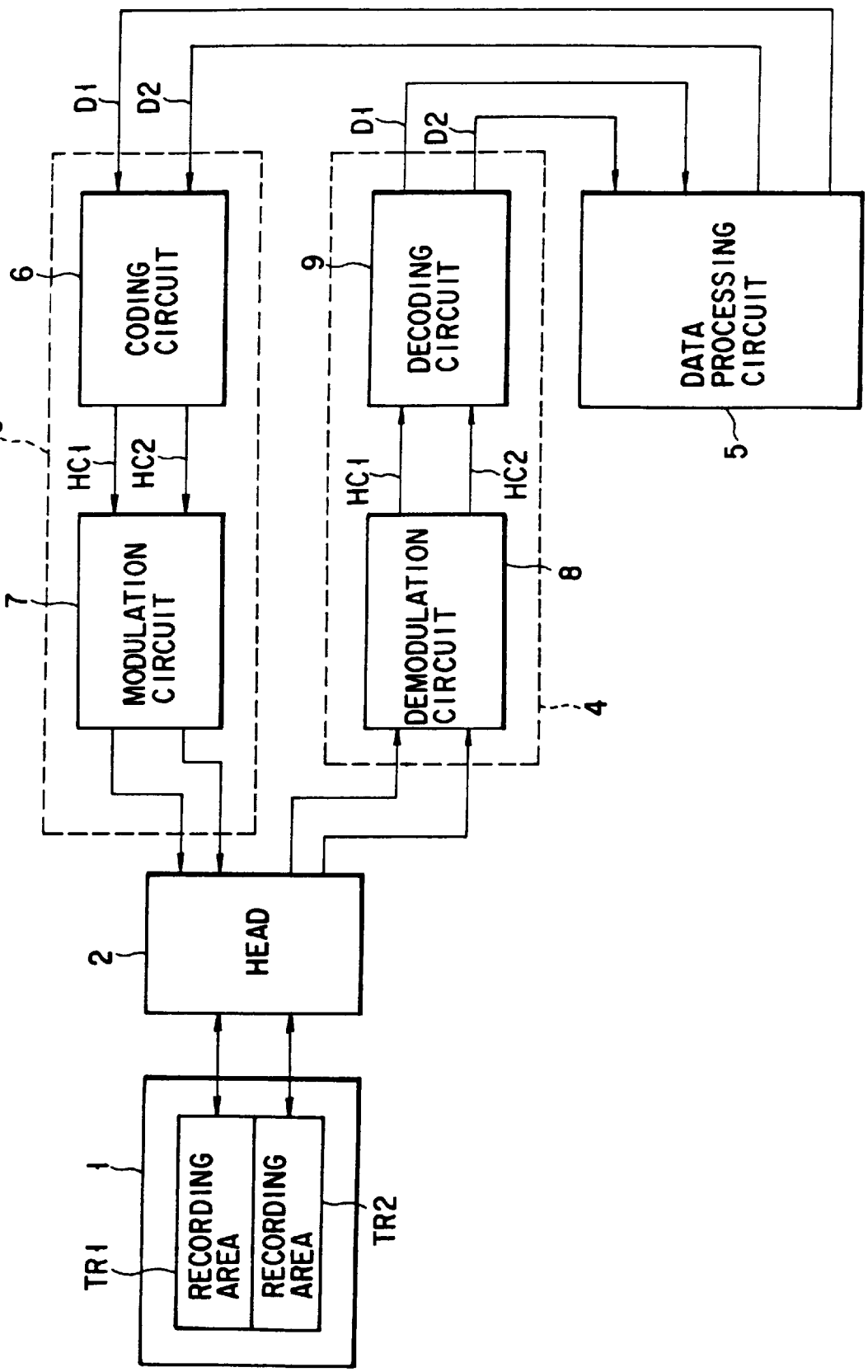
FIG. 1 is a block diagram which shows an overall arrangement of a data recording and reproducing apparatus according to the first embodiment of the present invention.

A preferred embodiment of a data recording and reproducing apparatus according to the present invention will now be described with reference to the accompanying drawings. FIG. 1 is a block diagram which shows an arrangement of the first embodiment. In the embodiment, an HDD employing the magnetic recording and reproducing system is assumed. As shown in FIG. 1, the HDD of the present embodiment is provided with a magnetic disk 1 as a recording medium, a magnetic head 2 for recording and reproducing, a data recording circuit 3, a data reproducing circuit 4, and a data processing circuit 5.

In the magnetic disk 1, data are generally recorded on both its sides, and each side has a recording area formed of a plurality of concentric circle-shaped tracks. However, for convenience of the explanation, the following describes only two tracks TR1 and TR2 which are adjacent to each other on one side. Similarly, the magnetic head 2 is generally positioned on each side of the magnetic disk 1, but in FIG. 1, for convenience of the explanation, the magnetic head 2 is positioned only on one side of the magnetic disk 1.

When a recording signal (write current) according to recording data (an orthogonal code stream, mentioned later) to be outputted from the data recording circuit 3 is transmitted to the magnetic head 2, the data are recorded in the magnetic disk 1. Moreover, the magnetic head 2 reads out the data magnetically recorded in the magnetic disk 1, and performs a reproducing operation so as to output a reproduction signal of the data to the data reproducing circuit 4.

The data recording circuit 3 has an orthogonal coding circuit (encoder) 6 and a modulation circuit 7 which are peculiar to the present invention. The encoder 6 converts data D1 and D2 to be recorded in the adjacent tracks TR1 and TR2 into code streams HC1 and HC2 which are orthogonal to each other. The modulation circuit 7 modulates the code streams HC1 and HC2 as a recording signal by using the NRZI (non return to zero inversion) system, for example, and outputs the modulated recording signal.

The data reproducing circuit 4 has a demodulation circuit 8 and a decoding circuit 9. The demodulation circuit 8 performs various signal processes, such as amplification, noise elimination and pulse shaping, on a reproduction signal from the magnetic head 2, and outputs reproduced data including the code streams HC1 and HC2 to the decoding circuit 9. The decoding circuit 9 decodes the reproduced data as recording data D1 and D2 respectively based upon a decoding rule of each code streams HC1 and HC2.

The data processing circuit 5 includes a magnetic disk controller for controlling input and output of the recording and reproducing data D1 and D2.

The following describes an operation of the present embodiment having the above arrangement. The HDD of the present embodiment is characterized by performing a converting process on two data streams D1 and D2 into orthogonal code streams HC1 and HC2 using the fourth Hadamard matrix as the orthogonal coding process by the coding circuit 6. The fourth Hadamard matrix is formed of four rows; "1, 1, 1, 1", "1, 0, 1, 0", "1, 1, 0, 0", and "1, 0, 0, 1", here "−1" in Hadamard matrix is represented as "0". The second and fourth rows "1, 0, 1, 0" and "1, 0, 0, 1" are used in the present embodiment.

Figure 2:
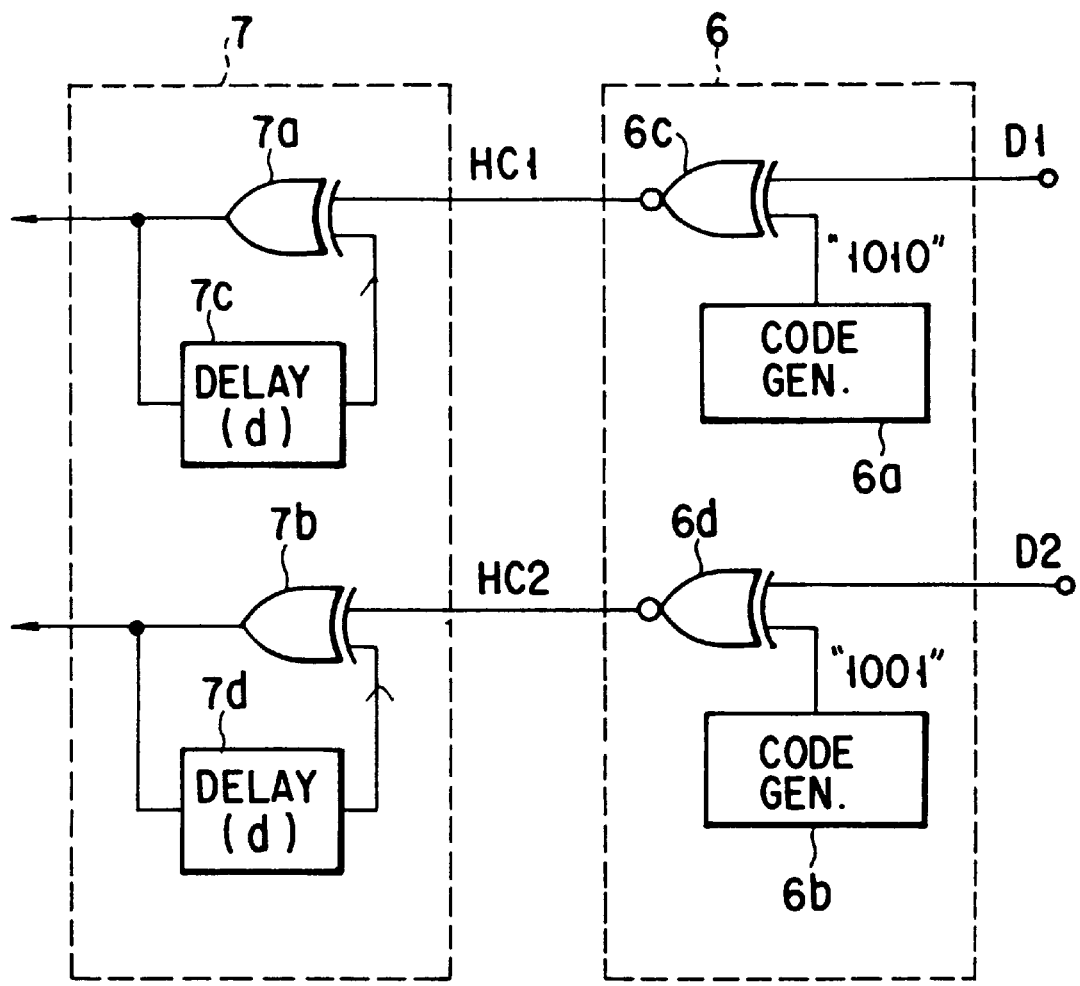
FIG. 2 is a block diagram which shows detailed configurations of an orthogonal coding circuit and a modulation circuit of the present embodiment.

As shown in FIG. 2, the coding circuit 6 is formed of a logic circuit including code generators 6a and 6b and exclusive NOR (EX-NOR) circuits 6c and 6d. The code generators 6a and 6b respectively generate a code C1 and a code C2 to be code streams which are orthogonal to each other. For example, in the case of 4-bit code stream, the code C1 is represented by "1, 0, 1, 0" and the code C2 is represented by "1, 0, 0, 1".

The EX-NOR circuit 6c orthogonally encodes input data D1 based upon the code C1 so as to output a code stream HC1. In the case where the above example is employed, the code stream HC1 is a code stream "1, 0, 1, 0" for data "1" of the input data D1 and a code stream "0, 1, 0, 1" for data "0" of the input data D1. Similarly, the EX-NOR circuit 6d orthogonally encodes input data D2 based upon the code C2 so as to output a code stream HC2. In the case where the above example is employed, the code stream HC2 is a code stream "1, 0, 0, 1" for data "1" of the input data D2 and a code stream "0, 1, 1, 0" for data "0" of the input data D2. The process performed by the EX-NOR circuit 6c is referred to as a process for encoding the data stream D1, and the process performed by the EX-NOR circuit 6d is referred to as a process for encoding the data stream D2.

The modulation circuit 7 has a logic circuit formed of exclusive OR (EX-OR) circuits 7a and 7b where output code streams HC1 and HC2 are supplied from the coding circuit 6 and has delay circuits (delay time is 1 clock cycle d) 7c and 7d for feeding back outputs of the EX-OR circuits 7a and 7b to its inputs. The modulation circuit 7 modulates orthogonal code streams HC1 and HC2 as recording signals using the NRZI system so as to supply the modulated recording signals to the magnetic head 2.

The decoding circuit 9 is synchronized with the same periodic clock as the code streams HC1 and HC2 so as to decode the code streams HC1 and HC2 from the reproduction signals outputted from the demodulation circuit 8 based upon their decoding rules.

Figure 3:
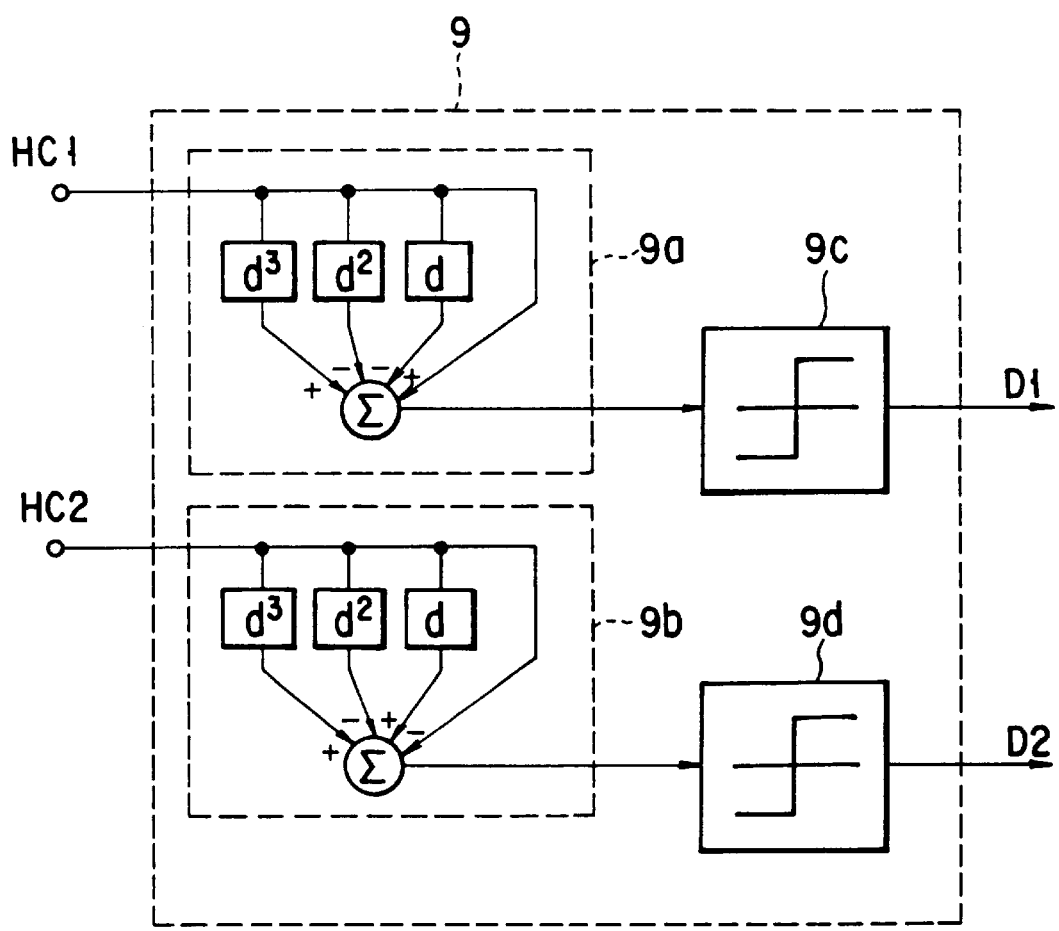
FIG. 3 is a block diagram which shows a detailed configuration of a decoding circuit of the present embodiment.

As shown in FIG. 3, the decoding circuit 9 is formed of decoders 9a and 9b where the code streams HC1 and HC2 are supplied and comparators 9c and 9d connected to outputs of the decoders 9a and 9b. In the decoders 9a and 9b, "$d^3$" represents a delay process for 3 clock cycles, "$d^2$" represents a delay process for 2 clock cycles, and "d" represents a delay process for 1 clock cycle. "+" or "−" polarity is added to outputs of the delay processing sections and the outputs are added so as to be outputted from the decoders. The decoder 9a decodes the code stream HC1, which are encoded based upon the code C1, as the data stream D1, and the decoder 9b decodes the code stream HC2, which are encoded based upon the code C2, as the data stream D2. The process performed by the decoder 9a is referred to as a process for decoding the code stream HC1 as the data stream D1, and the process performed by the decoder 9b is referred to as a process for decoding the code stream HC2 as the data stream D2.

The decoding circuit 9 decodes the original data streams D1 and D2 from the reproduced signals CH1 and CH2 based upon each decoding rule of the data streams D1 and D2. The decoding rules of the data streams D1 and D2 are described below. The decoding rules are determined based upon the coding rules as follows.

(1) The code stream applied to the data "1" of the data stream is used as a standard. The code stream of the data "1" is changed into "+" and the code stream of the data "0" is changed into "−" so that a code polarity array is obtained.

For example, when "1, 0, 1, 0" is given to the data stream D1 in the case of the data "1", it is changed into "+,−,+,−".

(2) A reproduction pulse polarity array is obtained based upon a reproducing state of the code stream to be applied to each data stream.

For example, in the case of the data "1" of the data stream D1, a reproduction signal is represented by "+1, 0, −1, 0", and in the case of the data "0", a reproduction signal is represented by "0, +1, 0, −1". The first two bits of the polarity of the reproduction pulse polarity array are always "+", and the last two bits are always "−". Therefore, the reproduction pulse polarity array is represented by "+, +, −, −".

(3) The code polarity array obtained in (1) is multiplied by the reproduction pulse polarity array obtained in (2) (per bit).

For example, the data stream D1 is obtained by "+, −,+, −"ד+, +, −, −,"="+, −, −, +".

(4) The obtained polarity is multiplied by a bit array represented by a clock phase relationship (a bit array represented by using a clock delay operator d) and each polarity, which is multiplied by the bit array, is added to each other so that a decoding rule of the code stream can be obtained.

For example, the data stream D1 is obtained such that "+, −, −, +"ד$d^3$, $d^2$, d, 1"="$d^3$−$d^2$−d+1" (decoding rule).

The decoding rule of the data stream D2 can be obtained in the same manner. The decoding rule of the data stream D2 is "$d^3$−$d^2$+d−1". The decoders 9a and 9b of FIG. 3 are designed based upon these decoding rules.

The following describes an operation of the data recording and reproducing apparatus adopting the orthogonal coding system mentioned above with reference to FIG. 4.

When the data D1 and D2 to be recorded to the adjacent tracks TR1 and TR2 are output from the data processing circuit 5, the data recording circuit 3 converts the data D1 and D2 into the code streams HC1 and HC2 which are orthogonal to each other.

In other words, the EX-NOR circuit 6c of the coding circuit 6 converts the data D1 (. . . 1, 1, . . .) into the code stream HC1 (. . . 1, 0, 1, 0, 1, 0, 1, 0, . . .) based upon the code C1. Here, the code C1 supplies the code stream "1, 0, 1, 0" to the data "1", and the code stream "0, 1, 0, 1" to the data "0".

In the modulation circuit 7, the code stream HC1 is modulated as a recording pulse W1 by the NRZI system so as to be supplied to the magnetic head 2. Magnetic data corresponding to the recording pulse W1 corresponding to the code stream HC1 are recorded in the track TR1 by a writing operation of the magnetic head 2.

Meanwhile, the EX-NOR circuit 6d of the coding circuit 6 converts the data D2 (. . . 1, 0, . . .) into the code stream HC2 (. . . 1, 0, 0, 1, 0, 1, 1, 0, . . .) based upon the code C2. Here, the code C2 supplies the code stream "1, 0, 0, 1" to the data "1", and the code stream "0, 1, 1, 0" to the data "0". The code stream HC2 is modulated as a recording pulse W2 by the modulation circuit 7 so as to be supplied to the magnetic head 2. As a result, magnetic data according to the recording pulse W2 which is orthogonal to the recording pulse W1 is recorded in the track TR2 which is adjacent to the track TR1.

In the data reproducing circuit 4, the reproduction signals, which are read out by the reading operation of the magnetic head 2, are decoded as the original data D1 and D2, and the data D1 and D2 are outputted to the data processing circuit 5.

Figure 4:
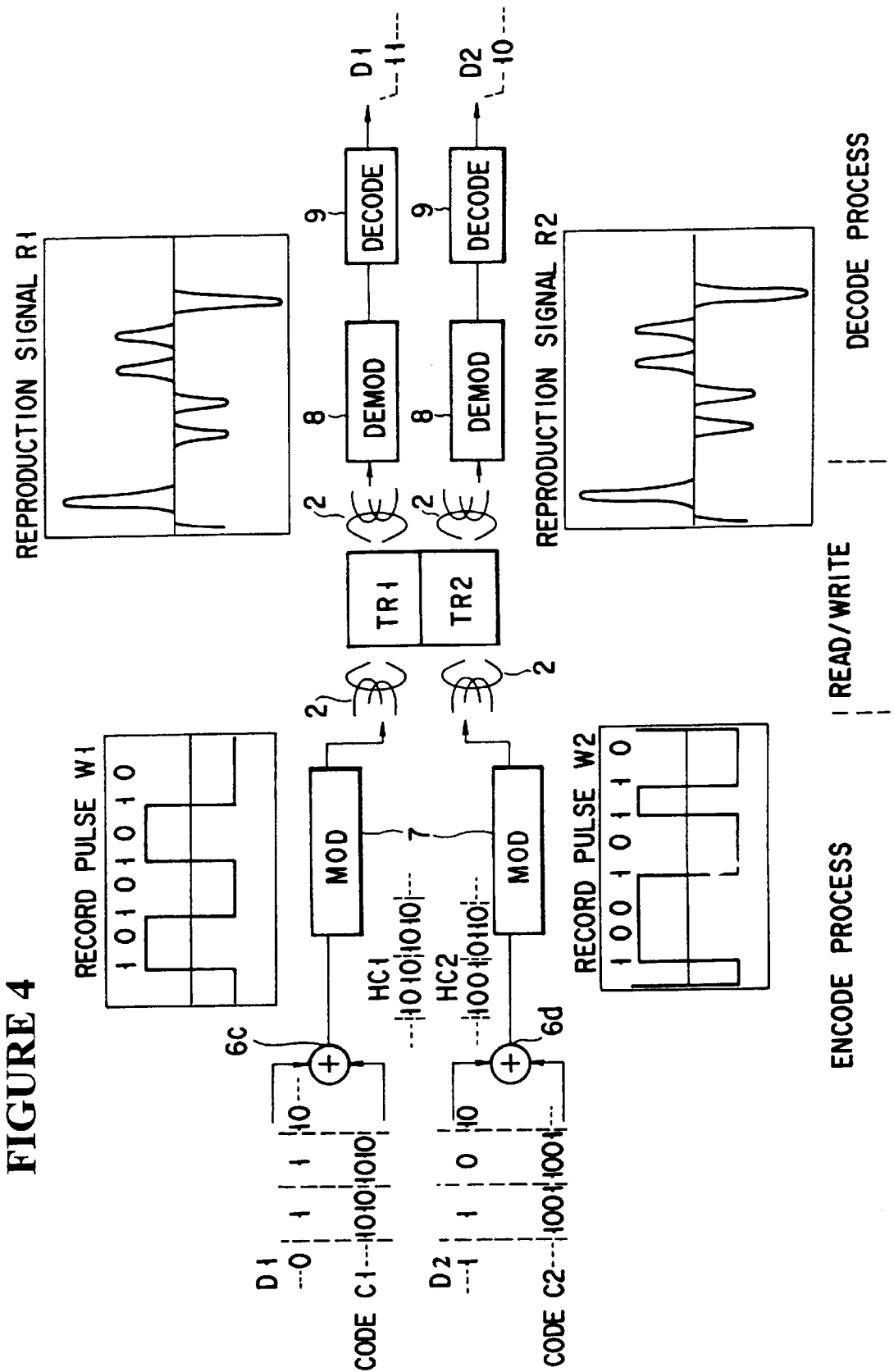
FIG. 4 schematically shows an operation of the present embodiment.

In other words, as shown in FIG. 4, in the data reproducing circuit 4, the data D1 (. . . 1, 1, . . .) are decoded from the reproduction signal R1, which are read out from the track TR1 by the magnetic head 2, based on the decoding rule of the data stream D1. Meanwhile, the data D2 (. . . 1, 0, . . .) are decoded from the reproduction signal R2, which are read out from the track TR2 by the magnetic head 2, based on the decoding rule of the data stream D2.

In accordance with the above embodiment, since the recording data D1 and D2 are encoded as the code streams HC1 and HC2 which are orthogonal to each other so as to be recorded on the adjacent tracks, even if crosstalk are caused from the adjacent tracks at the time of data reproduction, the data streams do not interfere with each other. Therefore, even if a recording medium, in which the adjacent tracks are extremely close to each other without providing a guard band area between the adjacent tracks TR1 and TR2, is used or even if the special recording system such as an azimuth recording system is not adopted, crosstalk caused due to the adjacent tracks does not influence the data reproduction, thereby making it possible to accurately discriminate respective recording data from the adjacent tracks TR1 and TR2 so as to reproduce (decode) the discriminated recording data.

Figure 5:
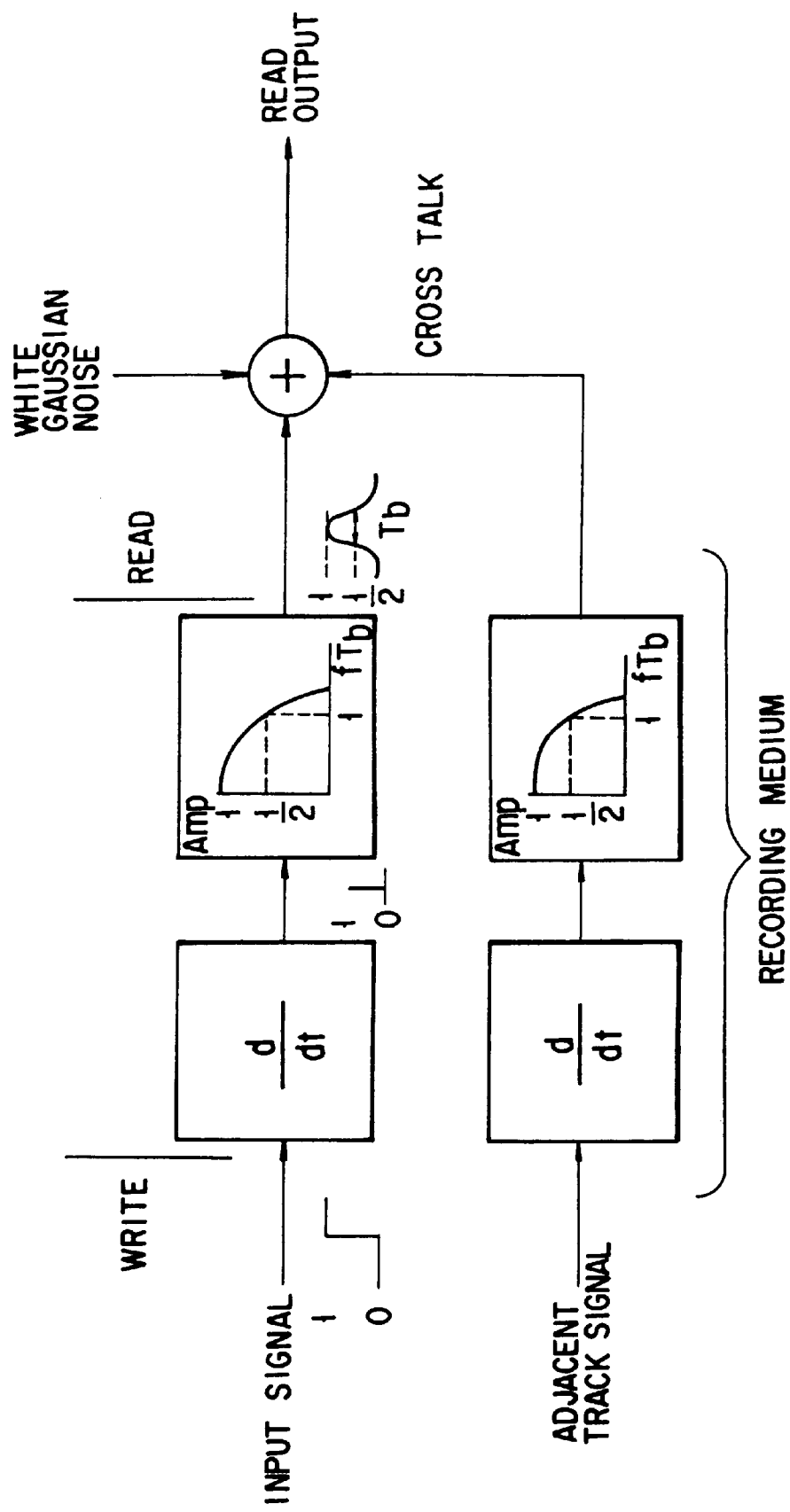
FIG. 5 shows a system for simulating the present invention.

The results of the present invention are explained by a simulation. In the present embodiment, the recording and reproducing characteristic (transmission characteristic) which is same as that of the data recording and reproducing apparatus, such as an HDD, are simulated on a computer by a system shown in FIG. 5, and a reproduction waveform after recording and reproduction is generated from a modulated code stream. It is actually a Lorentzian isolated reproduction waveform according to each recording magnetization inversion. Recording and reproducing outputs, which are same as those of the actual data recording and reproducing system, can be obtained by using the above method.

Figure 6:
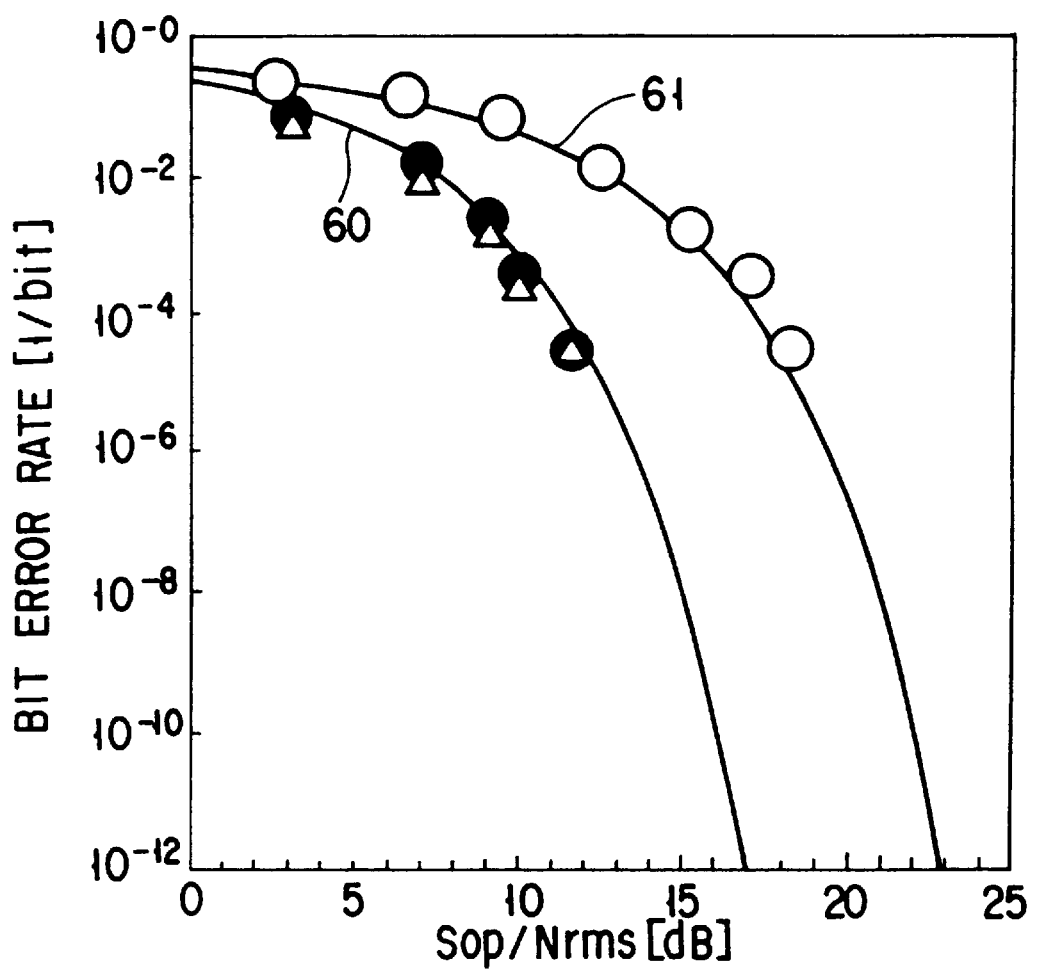
FIG. 6 illustrates data recording and reproducing characteristics of the present embodiment.

FIG. 6 shows a simulation result, which is obtained by adding a white Gaussian noise to the reproduction waveform obtained by the above manner, in the case where crosstalk due to adjacent tracks is not caused. As shown in FIG. 6, when the simulation result 60 of the present embodiment is compared with the simulation result 61 of a conventional system, the bit error rate is improved by 6 [dB], and when the S/N ratio is 11.5 [dB], the bit error rate is improved by 3 digits. The S/N ratio is represented by using a signal (zero to peak value) and a noise (root mean square value). The closed circle represents the code C1 and a open triangle represents the code C2.

In the conventional system, recording data are not encoded but are directly modulated by the NRZI system so as to be recorded. In both the present embodiment and conventional system, an amplitude detecting method is used for the reproduction codes, and a threshold value of NRZI is half of a peak value of the isolated reproduction waveform. As a result of this simulation, even in the case of the recording and reproducing system where the S/N ratio is low, track recording density is lowered by adopting the present embodiment to such a recording and reproducing system, but the error rate can be lowered.

Figure 7:
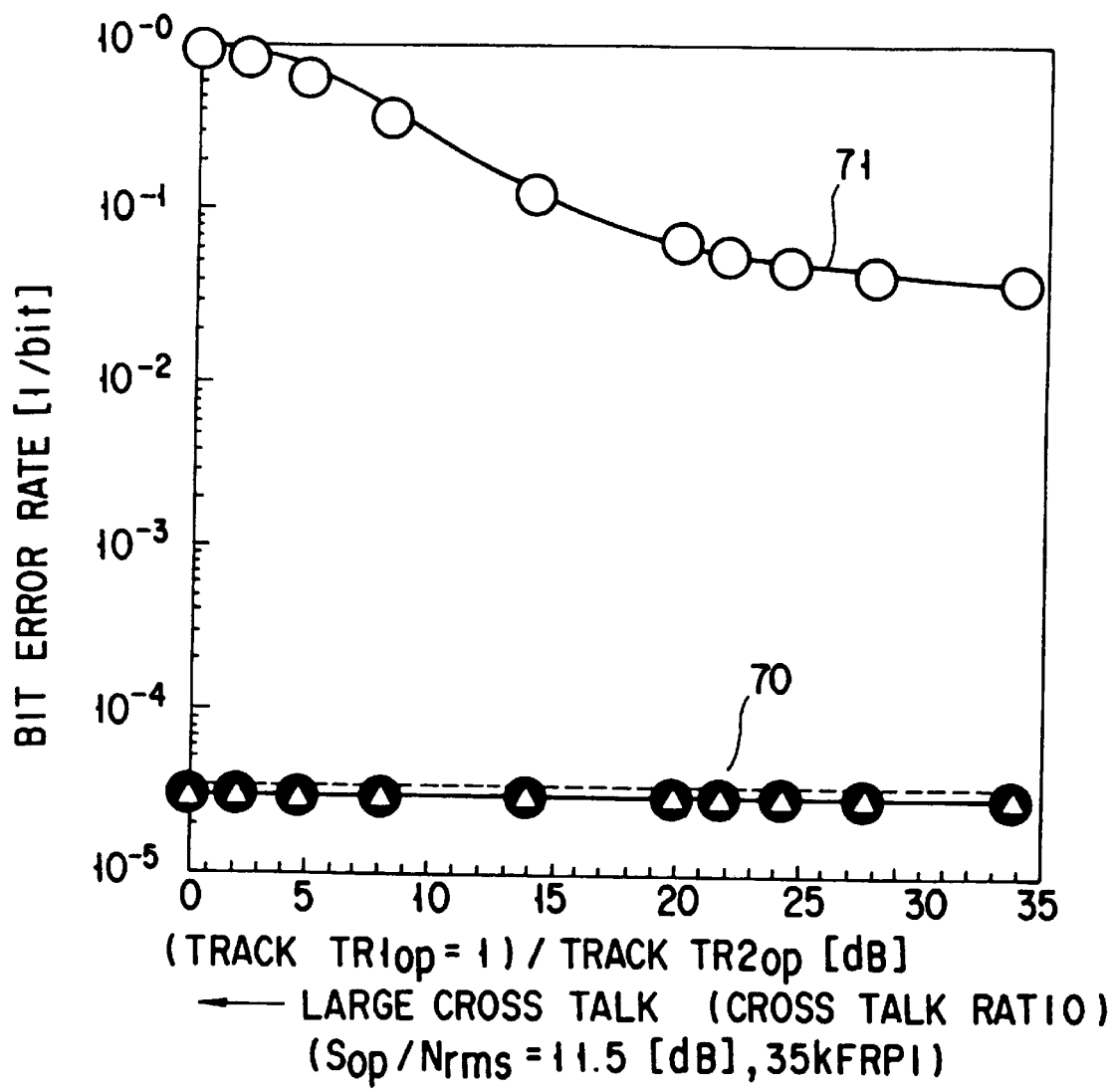
FIG. 7 illustrates data recording and reproducing characteristics of the present embodiment.

FIG. 7 shows a result of measuring a change in the error rate in the case where the crosstalk due to the adjacent track TR2 is caused in a reproduction signal from the track TR1. Compared with the conventional system (simulation result 71), in the present embodiment (simulation result 70), even if the level of the crosstalk becomes high, the error rate is hardly increased. Therefore, even in the case where tracking accuracy in the magnetic head 2 is a little low, recording data of adjacent tracks can be accurately decoded between the adjacent tracks where a guard band area does not exist. Moreover, in the case where, for example, a magneto-optical disk device is used instead of the HDD, even if a plurality of tracks are arranged so that their pitch is less than the optical resolution, only a recording signal from a target track can be securely decoded.

Figure 8:
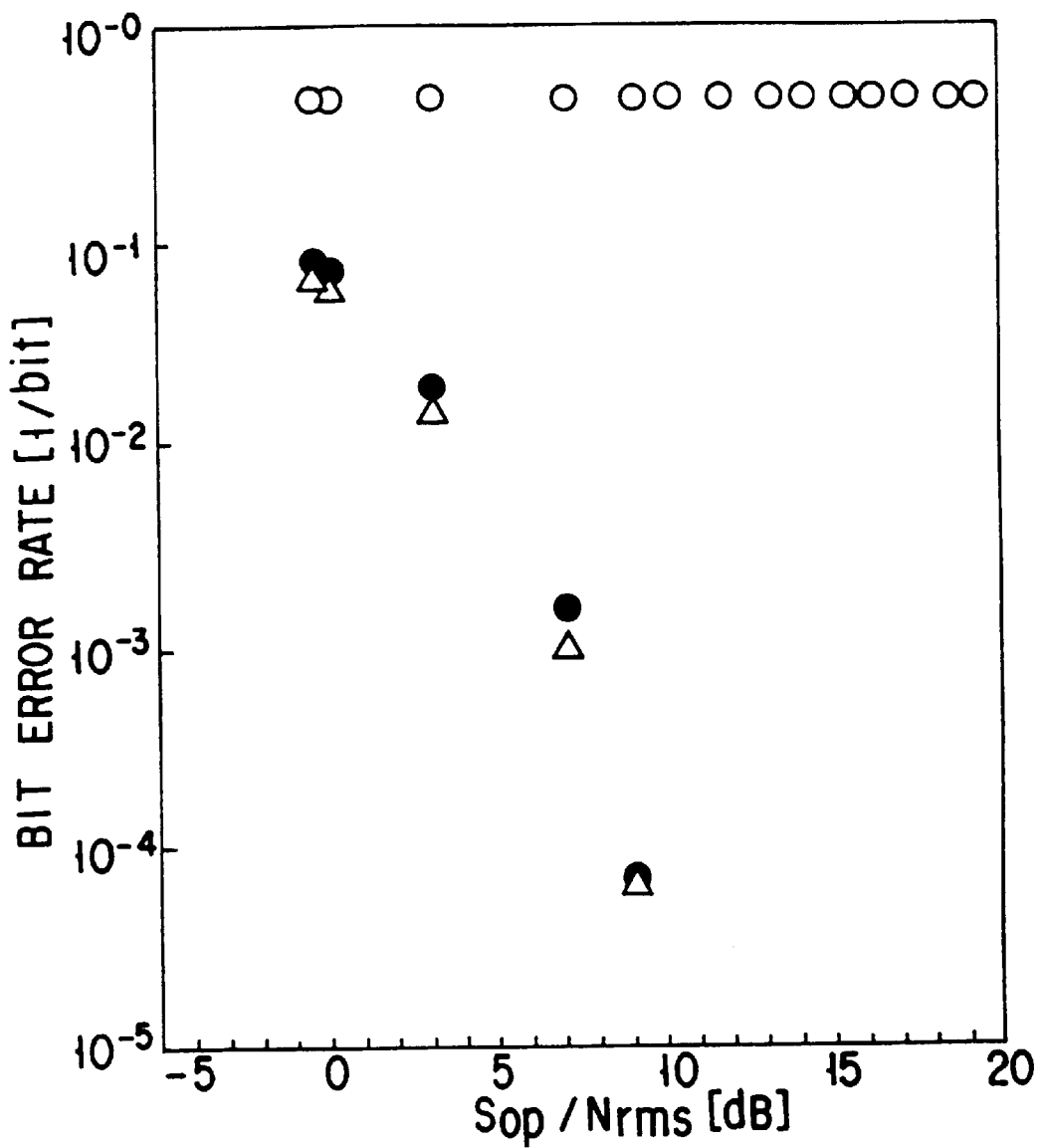
FIG. 8 illustrates data recording and reproducing characteristics of the present embodiment.

FIG. 8 shows a simulation result, which is obtained by comparing a conventional system with the case where the NRZ modulating system is used for a recording signal and an integral equalization system is used as a reproducing equalization process for a reproduction signal in the recording and reproducing system of the present embodiment. This simulation result is an error rate with respect to crosstalk and a Gaussian noise. The data used in the simulation is an M-sequence data. The integral equalization system used in the simulation is a partial response PR(1). The partial response is described in E. R. Kretzmer, "Generalization of a Technique for Binary Data Communication", IEEE, Trans., Communication Technology, Vol. 1, COM-14, February, 1966.

As is clear from the comparative result, in the case of the present embodiment (simulation result 80), compared to the conventional system (simulation result 81), as the S/N ration becomes higher, the error rate becomes lower.

In the present embodiment, is assumed that the data recording circuit 3 has the modulation circuit 7 for performing the NRZ modulating process and the data reproducing circuit 4 has an equalizing circuit for performing the integral equalization process.

In accordance with the arrangement of the present embodiment, it is possible to provide a digital data recording and reproducing apparatus, which is capable of attaining higher recording density without provision of a guard band area between tracks in a data recording and reproducing apparatus, such as an HDD, using a disk recording medium, without adoption of the azimuth recording system, which is a special recording system in a recording and reproducing apparatus, such as a VTR, and without influence of crosstalk between adjacent tracks.

Other embodiment of the data recording and reproducing apparatus according to the present invention will be described. The same portions as those of the first embodiment will be indicated in the same reference numerals and their detailed description will be omitted.

In the first embodiment, orthogonal code streams, such as the fourth Hadamard matrix, are used as recording data. These orthogonal code streams are complete orthogonal code streams. In the present invention, even if quasi orthogonal code streams are used instead of the complete orthogonal code streams, the data error rate due to crosstalk can be lowered compared to the conventional method.

Here, in the case where a number of code bits, which agrees with each other between two code streams, is represented by B1, a disagreed number of code bits is represented by B2, and a number of code bits composing each code stream is represented by B3, the quasi orthogonal code streams satisfy the following relation:

$|(B1-B2)/B3|<1$

According to this relation, the complete orthogonal code streams satisfy the following relation:

$|(B1-B2)/B3|=0$

For example, in 5-bit (B3=5) codes C1 and C2, a code stream of data "1" is represented by "1, 0, 0, 0, 1" and a code stream of data "0" is represented by "0, 1, 0, 0, 1" for the code C1 and a code stream of the data "1" is represented by "0, 0, 1, 0, 1" and a code stream of the data "0" is represented by "0, 0, 0, 1, 1" for the code C2. In this example, the relation is as follows:

$|(B1-B2)/B3|=(3-2)/5=0.2$

Figure 9:
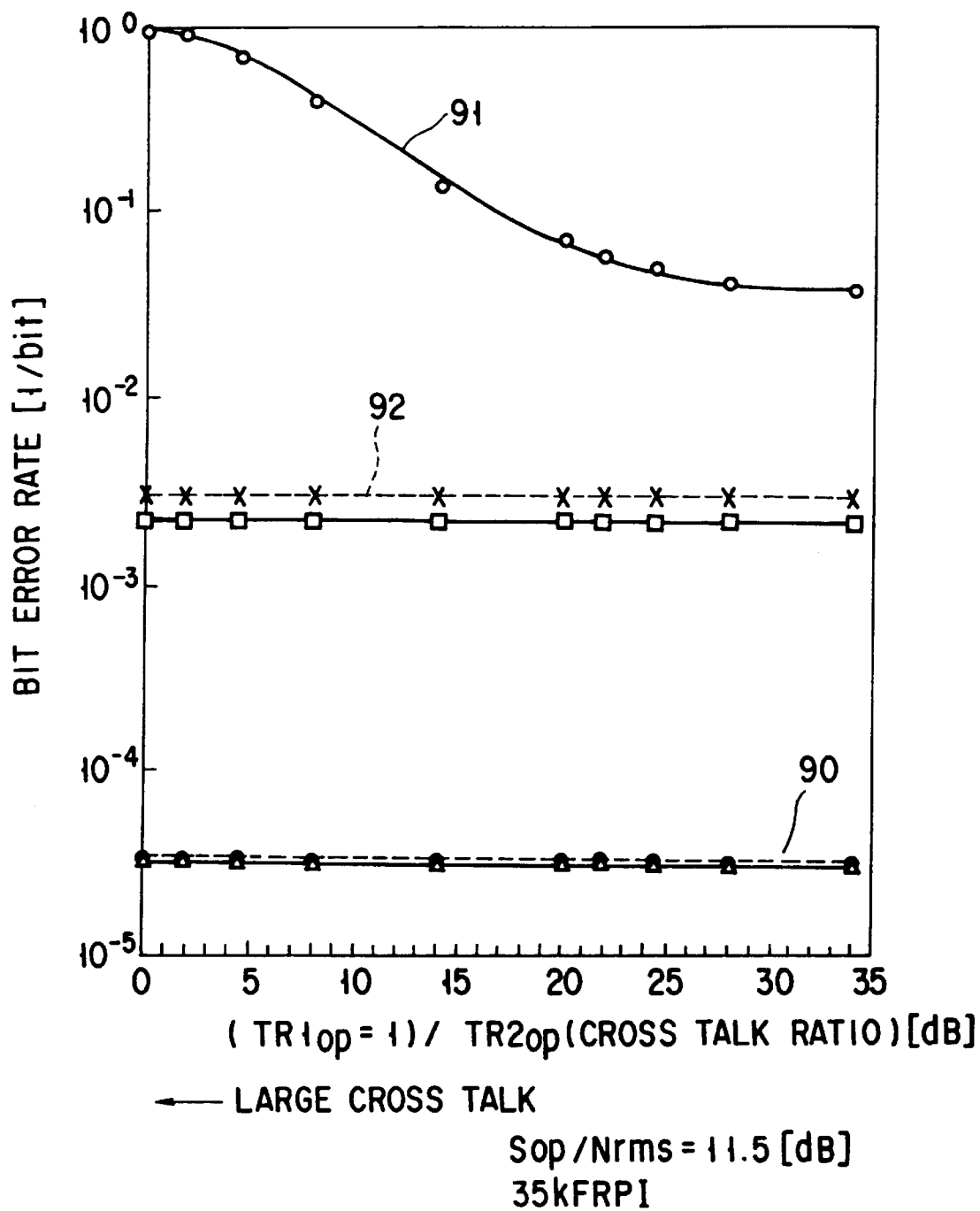
FIG. 9 illustrates data recording and reproducing characteristics of a second embodiment of the present invention.

FIG. 9 shows simulation results of a second embodiment using such quasi orthogonal code streams mentioned above. In FIG. 9, 92 is the simulation result of the present embodiment, 91 is the simulation result of the conventional system, and 90 is the simulation result of the error rate due to crosstalk in the first embodiment using the complete orthogonal code streams. The square represents the code C1 and the cross represents the code C2.

As is clear from the simulation results, also in the second embodiment, the error rate is higher compared to the case of the complete orthogonal code streams, but the error rate of the present embodiment is low and constant even when the level of the crosstalk becomes higher compared to the conventional system. Therefore, even in the case where the quasi orthogonal code streams are used instead of the complete orthogonal code streams, the similar result can be obtained. As a value of the above formula of the code streams is closer to "0", the better result can be obtained.

Figure 10:
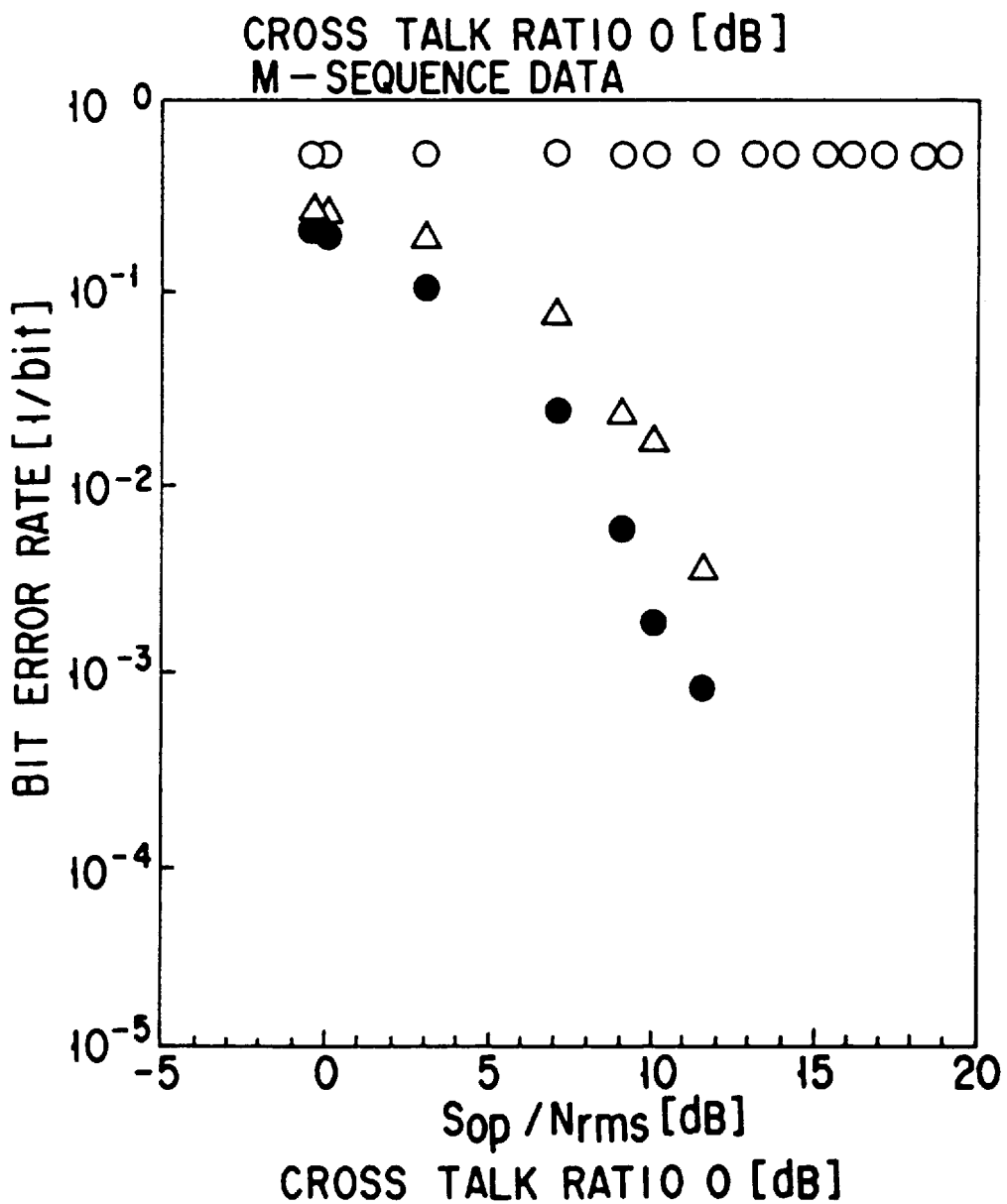
FIG. 10 illustrates data recording and reproducing characteristics of a third embodiment of the present invention.

The following describes a third embodiment, which adopts an equalizing method by the partial response in class 4 as a reproducing equalization process for a reproduction signal. In the partial response in class 4, a pre-coding is performed by the modulation circuit and an equalization is performed by the demodulation circuit. In the integral equalization, a pre-coding is not necessary. FIG. 10 shows simulation results 100 compared with the conventional system 101 (the NRZI modulating system without encoding). The simulation results in FIG. 10 is an error rate with respect to crosstalk and to a Gaussian noise. In addition, as the orthogonal code C1, "1, 0, 1, 0" is used for the data "1" and "0, 1, 0, 1" is used for the data "0". "1, 1, 1, 1" is used for the data "1" and "0, 0, 0, 0" is used for the data "0" as the orthogonal code C2.

As is clear from the comparative results, in the case of the present embodiment (simulation result 100), the S/N ratio becomes higher, the error rate becomes lower compared with the conventional system (simulation result 101).

The following describes a fourth embodiment where the data on the adjacent tracks TR1 and TR2 are collectively reproduced by the magnetic head using the data recording and reproducing system of the present invention.

As shown in FIG. 11, it is assumed that the data of the orthogonal data streams HC1 and HC2 are recorded on the adjacent tracks TR1 and TR2 by using the data recording and reproducing system of the present embodiment. More specifically, as shown in FIG. 12A, the data stream HC1 represented by ". . . 1, 0, 1, 0, . . ." are recorded on the track TR1, and as shown in FIG. 12B, the data stream HC2 represented by ". . . 1, 1, 0, 0, . . ." are recorded on the track TR2.

The magnetic head 2 collectively reads out the data from the adjacent tracks TR1 and TR2, and as shown in FIG. 12C, outputs a reproduction signal waveform which is obtained by combining the data stream HC1 and the data stream HC2. When the reproduction signal waveform is inputted to the decoding circuit 9 so as to be decoded based upon their respective decoding rules. As a result, as shown in FIG. 12D, the data of the data stream HC1 are decoded from the track TR1, and as shown in FIG. 12E, the data of the data stream HC2 are decoded from the track TR2.

According to the fourth embodiment, when the data corresponding to the orthogonal or quasi orthogonal code streams are recorded to the respective adjacent tracks, it is possible to easily realize a batch reproducing system (multi-track magnetic head system) for securely discriminating the data collectively from the adjacent tracks. When the batch reproducing system is utilized, it is possible to securely reproduce data from a magnetic disk with high track density for a short time.

As mentioned above, in accordance with the present invention, when data are recorded and reproduced by using the orthogonal code streams or quasi orthogonal code streams, it is possible to securely realize data reproduction, from which influence of crosstalk between adjacent recording areas are eliminated, without providing a guard band area and a gap area between adjacent tracks and without adopting a special recording system, such as the azimuth recording system. Therefore, when the present invention is applied to a hard magnetic disk device or a magneto-optically disk device, for example, secure data discriminating function can be realized even in the case of high track density, thereby making it possible to obtain high recording density. Moreover, the application of the present invention makes it possible to realize the batch reproducing system for reproducing data which are discriminated collectively from adjacent recording areas.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the above embodiments may be combined and the recording medium is not limited to the disk-like recording medium but may be a tape-like recording medium.

What is claimed is:

1. A digital data recording and reproducing apparatus based on a non-azimuth recording method for a magnetic disk having a plurality of concentrically tracks without providing guard bands between adjacent tracks, said apparatus comprising:

code generating means for generating two code streams which are orthogonal to each other;

coding means for coding two digital data to be recorded on two adjacent tracks of the magnetic disk using the two code streams into two orthogonal coded streams which are orthogonal to each other the coding means comprising a digital circuit which processes the two digital data and the two code streams to output the two orthogonal coded streams;

modulating means for modulating the two orthogonal coded streams output from said coding means using an NRZI system so as to output two record signals;

a magnetic head device which records the two record signals output from the modulating means on the two adjacent recording tracks of the magnetic disk and reproduces two record signals recorded on the two adjacent recording tracks of the magnetic disk;

demodulating means for demodulating the record signals output from the magnetic head device so as to output the two orthogonal coded streams; and decoding means for decoding the two orthogonal coded streams output from said demodulating means so as to reproduce the digital data recorded on the two adjacent tracks of the magnetic disk.

2. The apparatus according to the claim 1, wherein said modulating means modulates the two orthogonal coded streams using an NRZI system and demodulating means comprises means for performing an integral equalizing process on the record signals output from the magnetic head device.

3. The apparatus according to claim 1, wherein said code generating means generates the two orthogonal code streams using a fourth Hadamard matrix and said decoding means decodes the two orthogonal coded streams in accordance with a decoding rule corresponding to the fourth Hadamard matrix.

4. (New) The digital data recording and reproducing apparatus according to claim 1, wherein said digital circuit is an exclusive-NOR circuit and said two code streams comprises two bit streams including repetition of "0110" and "1001".

5. A digital data recording and reproducing apparatus based on a non-azimuth recording method for a magnetic disk having a plurality of concentrically tracks without providing guard bands between adjacent tracks, said apparatus comprising:

code generating means for generating two quasi orthogonal code streams which are orthogonal to each other;

coding means for coding two digital data to be recorded on two adjacent tracks of the magnetic disk using the two orthogonal code streams into two orthogonal coded streams which are orthogonal to each other the coding means comprising a digital circuit which processes the two digital data and the two orthogonal code streams to output the two orthogonal coded streams;

modulating means for modulating the two quasi orthogonal coded streams output from said coding means using an NRZI system so as to output two record signals;

a magnetic head device which records the two record signals output from the modulating means on the two adjacent recording tracks of the magnetic disk and reproduces two record signals recorded on the two adjacent recording tracks of the magnetic disk;

demodulating means for demodulating the record signals output from the magnetic head device so as to output the two quasi orthogonal coded streams; and decoding means for decoding the two orthogonal coded streams output from said demodulating means so as to reproduce the digital data recorded on the two adjacent tracks of the magnetic disk, wherein said two quasi orthogonal code streams satisfy:

$$|(B1-B2)/B3|<1$$

where B1 is a number of code bits which agree with each other between the two quasi orthogonal code streams, B2 is a number of code bits which disagree with each other between the two quasi orthogonal code streams, and B3 is a number of code bits included in each of the two quasi orthogonal code streams.

6. The apparatus according to claim 5, wherein said modulating means modulates the two quasi orthogonal coded streams using an NRZI system and said demodulating means comprises means for performing an integral equalizing process on the record signals output from the magnetic head device.

7. The digital data recording and reproducing apparatus according to claim 5, wherein said digital circuit is an exclusive-NOR circuit and said two code streams comprises two bit streams including repetition of "0110" and "1001".

* * * * *